United States Patent
Kawaguchi

[15] 3,642,562
[45] Feb. 15, 1972

[54] MATERIAL FOR BLACKBOARDS COMPRISING SYNTHETIC RESIN AND PROCESS FOR MAKING THE SAME

[72] Inventor: Ryuzo Kawaguchi, Tokyo, Japan

[73] Assignee: Kawaguchi Rubber Industrial Co., Ltd., Tokyo, Japan

[22] Filed: May 28, 1969

[21] Appl. No.: 828,475

[30] Foreign Application Priority Data

Sept. 10, 1968 Japan.................................43/64832

[52] U.S. Cl....................................161/88, 35/66, 117/28, 117/76, 117/104, 117/119.2, 117/138.8, 161/162, 161/163, 161/168, 161/171, 161/250

[51] Int. Cl.................................................B43l 1/10

[58] Field of Search................35/66; 161/88, 162, 163, 168, 161/171, 250; 117/27, 28, 76, 138.8, 104, 119.2

[56] References Cited

UNITED STATES PATENTS

| | | | |
|---|---|---|---|
| 2,452,235 | 10/1948 | Gold | 35/66 |
| 2,541,497 | 2/1951 | Buxbaum et al. | 35/66 |
| 2,626,877 | 1/1953 | Carnes | 117/138.8 |
| 2,936,249 | 5/1960 | Hennemann | 117/76 |
| 2,955,364 | 10/1960 | Shaw et al. | 35/66 |
| 3,497,969 | 3/1970 | Schwoegler | 35/66 |
| 3,515,626 | 1/1970 | Duffield | 161/162 |
| 3,525,664 | 8/1970 | Hale et al. | 117/28 X |

*Primary Examiner*—William A. Powell
*Attorney*—McGlew and Toren

[57] ABSTRACT

A composite material for blackboards essentially consisting of a layer of synthetic resin containing fine grains of an inorganic material distributed therein, said layer being deposited on a flexible carrier body and having a top coating of an antistatic agent. The composite material may be used as such or mounted on a stiff board.

The invention also relates to a process for preparing the composite material which comprises the steps of mixing fine grains of inorganic material evenly into the synthetic resin, depositing the mixture on a flexible carrier and applying on top a coating of an antistatic agent.

9 Claims, 5 Drawing Figures

INVENTOR
Ryuzo Kawaguchi by John J. McGlew
ATTORNEY

MATERIAL FOR BLACKBOARDS COMPRISING SYNTHETIC RESIN AND PROCESS FOR MAKING THE SAME

SUMMARY OF THE INVENTION

The present invention relates to a material for a blackboard and to a process of making the same.

The term "blackboard" is intended to designate any dark, smooth surface used for writing, drawing and the like with chalk or crayons.

More particularly, the invention relates to a blackboard made of synthetic resin with fine grains or inorganic material evenly distributed in the resin and the mixture spread over a flexible carrier body which may, if desired, be mounted on a rigid board. As a top coating, the composite body comprises an antistatic agent for a purpose to be explained hereinbelow.

Attempts have already been made to use synthetic resins as surface materials for blackboards which were, however, not entirely satisfactory for the intended purpose. In order to understand this, it should be borne in mind that the ideal difference in brightness, measured by a conventional scale of brightness, between a new surface of a blackboard and one which was already used, should not exceed 2 or 3°. In a blackboard, the surface of which consists substantially of synthetic resin, the difference is considerably greater because chalk particles will stick to the surface of the blackboard due to static electricity produced by friction between said surface and the chalk or eraser.

Such an increase in the difference of brightness between new and used surfaces causes writings or drawings to become indistinct. With a brightness difference of more than two or three, the blackboard becomes practically useless for the purpose of writing or drawing thereon.

This is the main reason why blackboards with a surface consisting of synthetic resin have not been used up to now, in spite of the advantages of low cost and high durability.

It is an object of the invention to provide material for blackboards which consist substantially of synthetic resin, but are free of the above-mentioned drawback of the known blackboards.

It is another object of the invention to provide material for blackboards having a surface of synthetic resin which after use will not have a difference in brightness as compared to the unused surface portions of more than 2° or 3°.

It is yet another object of the invention to provide a process for making blackboard material having the above advantageous properties.

Other objects and advantages of the invention will become apparent from the following detailed description, together with the accompanying drawing.

Generally speaking, the material according to the invention is composed of a layer of synthetic resin in which fine grains of an inorganic material are evenly dispersed. This composite layer is deposited on a flexible carrier body and is coated on top with an antistatic agent. The composite flexible sheet thus obtained may be used as such, that is to say, it may either be used to cover a wall or it may be rolled into a cylindrical sheet, a scroll-shaped sheet or map and the like.

In another embodiment, the composite sheet may be applied by means of an adhesive to a rigid base board such as veneer board, chipboard and the like, to form a conventional blackboard.

In the accompanying drawings, the two embodiments mentioned above are illustrated by way of example.

Figure 1:
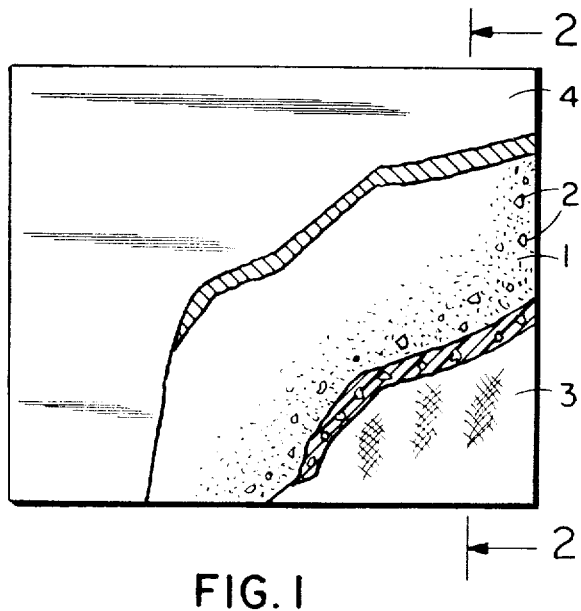
FIG. 1 is a plan view of the composite flexible sheet, partly broken away.
Figure 2:
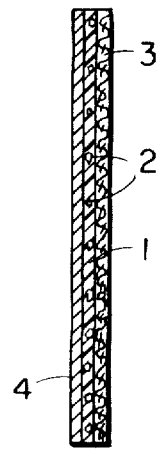
FIG. 2 is a section taken along line 2—2 of FIG. 1.
Figure 3:
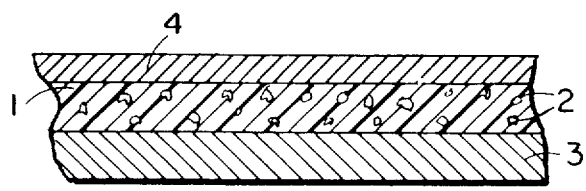
FIG. 3 is a similar showing on a larger scale.

Referring to FIGS. 1—3 of the drawing, 1 designates a layer of a synthetic resin in which a plurality of grains 2 are evenly distributed. At 3, a carrier body is shown which consists of a flexible sheet, and 4 designates an antistatic agent which forms the top coating.

Figure 4:
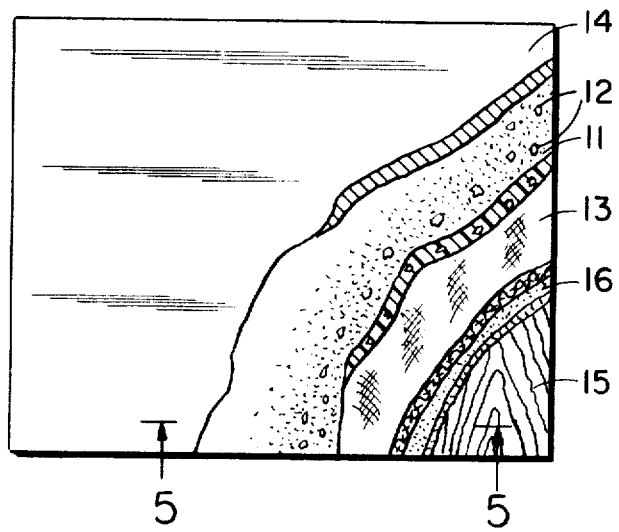
FIG. 4 illustrates the second embodiment in plan view.
Figure 5:
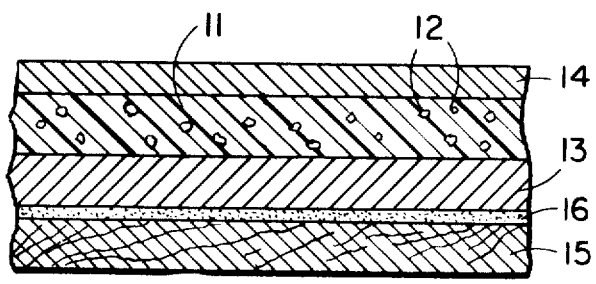
FIG. 5 is a section taken along line 5—5 of FIG. 4.

In FIGS. 4 and 5, 11 designates the layer of synthetic resin in which grains 12 are distributed. The flexible carrier body is shown at 13, the antistatic agent at 14. In this embodiment, a rigid base body is shown at 15, attached to the flexible carrier by a layer of adhesive 16.

The process for making the blackboard material of the invention comprises the steps of first mixing fine grains of inorganic material into a synthetic resin, evenly distributing the grains throughout the resin, thereafter applying the mixture onto a flexible sheet serving as a carrier and, finally, coating, e.g., spraying, the top of the composite material with an antistatic agent.

To make a rigid blackboard as conventionally used in schools, the composite material is mounted on a stiff board by means of a known adhesive. The mounting can be done before or after the application of the antistatic coating.

The materials to be used in the various steps and which will form the several layers of the composite body will now be described in full detail.

The synthetic resin may be thermoplastic or thermosetting or a mixture of both types. Synthetic resins to be used individually or as a mixture include: soft polyvinyl chloride, polyethylene, polypropylene, polyethylene-acetic acid copolymer, vinyl chloride-vinyl acetate copolymer, acrylonitrile-butadiene-styrene copolymer, synthetic rubber, unsaturated polyester resin, polyurethane elastomer, double fluid polyurethane, epoxy resin and diallyl phthalate.

The fine grains or inorganic material to be distributed evenly in the synthetic resin individually or as a mixture include: silica sand, glass, aqueous rock, quartz, silicon carbide, aluminum oxide, mica and iron oxide.

The flexible carrier may be formed by a sheet of synthetic resin, synthetic leather, paper or cloth.

The antistatic agent applied as top coating may be a product derived from partial hydrolysis of silicon tetrachloride, a surface active agent of cation type or a surface active agent of amphoteric type. The antistatic agent effectively prevents static electricity from developing due to friction between chalk and blackboard surface or between eraser and blackboard surface, which would otherwise attract particles of chalk to the blackboard surface and thereby reduce the efficiency of the eraser.

Since the carrier is a flexible sheet, it may be easily applied to any baseboard, especially to a curved baseboard. Furthermore, this feature of the invention is advantageous when entire walls of a room, for example a classroom, are to be used as surfaces on which writings or drawings with chalk can be made and erased. To this end, the surface material of this invention may be applied to walls by use of an adhesive.

When the flexible sheet is to be applied to a base board, such as chipboard or other hard board, to make a conventional blackboard, any adhesive may be employed that will join the resin sheet to the board. Many adhesives are known which are derived from synthetic resins, phenol formaldehyde vinyl resins and others which may be conveniently used.

The synthetic resins to be used for the distribution of grains of inorganic materials may be applied in various forms, e.g., as solutions in organic solvents, pastes obtained by dispersing synthetic resin in a plasticizer which is soluble in the synthetic resin or in solid form. The form in which the resins are processed depends in each case on the equipment of the manufacture or on the availability of the resins in a particular form.

The grains of inorganic material to be incorporated in the synthetic resin should be selected with a view to their hardness compared to that of chalk. The main purpose of the grains is their counteracting the abrasion effected by the chalk. If the grains are of lower hardness than chalk, they would not effectively prevent abrasion of the resin so that the blackboard would be worn away too soon.

The grain size has likewise some bearing on the usefulness of the blackboard. In any particular case, the size or diameter of the grains depends mainly upon the constituents of the chalk or crayons used and the thickness of the coating of the resin surface layer; it may also be affected by some factors of the preparation of the board.

When, for instance, the thickness of the antistatic coating is from 50—100 microns, the grain diameter advantageously ranges from 10–40 microns. When the coating thickness is over 100 microns, larger grains may be used. In some cases, for instance when the coated blackboard is to undergo an embossing treatment or similar surface treatment, grains of still larger diameter may be advisable.

It should be noted that the application of the antistatic agent is the most essential feature of the present invention since, without the same, many particles of chalk would remain after the erasing and the attempted improvement relating to difference in the brightness after use would not be accomplished.

In the following examples, preferred embodiments of the invention will be described by way of illustration, but it should be noted that many variations in the details can be made without departing from the spirit of the invention.

All parts are by weight.

(EXAMPLE 1

1. A flexible sheet serving as carrier is made by calandering, in a known manner, a mixture of

| | |
|---|---|
| Polyvinyl chloride resin ($\bar{P}$= 800) | 100 parts |
| Di-(2-ethylhexyl)phthalate | 50 parts |
| White lead | 6 parts |
| Lead stearate | 1 part |
| Calcium carbonate | 200 parts |
| Pigment (dark green) | 3 parts | into a sheet of 0.6 mm. thickness. This sheet resembles artificial leather.

2. The sheet of the synthetic resin consists primarily of polyurethane with several additives. It is composed as follows:

| | |
|---|---|
| A 45% solution of polyurethane in ethyl acetate-toluene | 100 parts |
| Curing agent | 50 parts |
| Thinner | 60 parts |
| 3. The grains consist of silica sand in powder form, having a grain diameter of 25–40μ | 37.5 parts |
| suspended in butyl acetate | 37.5 parts |
| and | |
| toluene | 37.5 parts |

The solution 2 and the suspension 3 are mixed thoroughly and spread on the flexible sheet described under 1. The distribution of the mixture on the leather may be effected by spraying. The amount of the resin mixture is 300 g./m².

The leather thus covered with the synthetic resin is then subjected to heat curing for 5 minutes in a furnace heated to 120° C. It is then allowed to cool and is rolled up, whereupon it is allowed to remain for about 48 hours in a room in which the temperature is maintained constant at 25° C. and the humidity at 55 percent. The curing of the product is thereby accomplished.

Next, the product is placed on a flat support and coated with the antistatic agent by means of a roll-coater of the photogravure type. The antistatic agent consists of a 5 percent dispersion of the partially hydrolyzed product of silicon tetrachloride (trade name coalcoat, made by the Coalcoat Co., Ltd. of Japan) in a methanol-butanol mixture 2:1. The amount of the coating applied is 30 g./m². The article is then dried for 3 minutes in a furnace heated to 80° C., whereupon it is cooled and rolled up once more.

The product thus obtained is ready for practical use as a scroll-shaped blackboard. In this embodiment, the brightness difference between a new surface and an already used surface is 1.5 with the result that the effect of erasions as well as distinctness of writings or drawings are of almost optimum quality.

EXAMPLE 2

The procedure of example 1 is followed until the flexible leather sheet covered with the synthetic resin and topped by the antistatic agent is completely finished. The scroll-shaped sheet is then applied to a plywood board having a thickness of 6 mm. with interposition of adhesive material consisting of a vinyl acetate emulsion. The board is then allowed to stand for hours to permit the adhesive to set, whereupon the article is ready for use.

What is claimed is:

1. A composite material for blackboards which comprises a layer of a synthetic resin, said layer containing evenly distributed therein fine grains of an inorganic material, a flexible carrier body for said layer of synthetic resin, and a top coating of an antistatic agent derived by partial hydrolysis of silicon tetrachloride.

2. The composite material according to claim 1, comprising as synthetic resin soft polyvinyl chloride, polyethylene, polypropylene, polyethylene-acetic acid copolymer, vinyl chloride-vinyl acetate copolymer, acrylonitrile-butadiene-styrene copolymer, synthetic rubber, unsaturated polyester resin, polyurethane elastomer, double fluid polyurethane, epoxy resin and diallyl phthalate, or a mixture of said resins.

3. The composite material according to claim 1, comprising as inorganic material grains of silica sand, glass, aqueous rock, quartz, silicon carbide, aluminum oxide, mica or iron oxide, or mixtures thereof.

4. The composite material according to claim 1, comprising as flexible carrier body a sheet of synthetic resin, synthetic leather, paper or cloth.

5. The composite material according to claim 1, comprising as an antistatic agent a surface active agent of cation type or of amphoteric type.

6. The composite material according to claim 1, wherein the grain size of the inorganic material has a diameter of 10—40 microns, dependent on the hardness of the writing material used and on the coating thickness of the antistatic agent.

7. A blackboard comprising a rigid base board and a body of composite material as claimed in claim 1 permanently affixed thereto.

8. A process for making composite materials for blackboards, which comprises incorporating into a synthetic resin fine grains of an inorganic material, thoroughly mixing the mass, depositing the same on a flexible carrier body, evenly spreading the synthetic on said carrier, and applying an antistatic agent derived by a partial hydrolysis of silicon tetrachloride as top coating on said composite material.

9. A process for making composite materials for blackboards, which comprises incorporating into a synthetic resin fine grains of an inorganic material, thoroughly mixing the mass, depositing the same on a flexible carrier body, evenly spreading the synthetic on said carrier, and applying an antistatic agent derived by a partial hydrolysis of silicon tetrachloride as top coating on said composite material and which comprises:

a. preparing a solution of polyurethane in ethyl acetate-toluene, adding a curing agent for the polyurethane and a thinner;

b. preparing, separately, a dispersion of silica sand powder, with a grain diameter of 25–40 microns, in butyl acetate-toluene;

c. mixing the solution and the dispersion;

spraying the combined mixture on a flexible sheet of synthetic resin in the amount of about 300 g./m², and subjecting to curing for 5 minutes at 120° C;

e. cooling the product, rolling it up and allowing it to remain for 48 hours in a room with a temperature maintained at 25° C. and a humidity maintained at 55 percent;

f. flattening the rolled product on a support and coating it with a 5 percent solution of partially hydrolyzed solution tetrachloride in methanol-butanol mixture 2:1, the amount of coating applied being 30 g./m²; and g. drying the product for 3 minutes at 80° C., cooling and rolling it up once more.

* * * * *